(12) United States Patent
Imatoh (10) Patent No.: US 11,798,140 B2
(45) Date of Patent: Oct. 24, 2023

(54) HEAD-UP DISPLAY, VIDEO CORRECTION METHOD, AND VIDEO CORRECTION PROGRAM

(71) Applicant: LAPIS Technology Co., Ltd., Yokohama (JP)

(72) Inventor: Yuki Imatoh, Yokohama (JP)

(73) Assignee: LAPIS TECHNOLOGY CO., LTD., Yokohama (JP)

( * ) Notice: Subject to any disclaimer, the term of this patent is extended or adjusted under 35 U.S.C. 154(b) by 0 days.

(21) Appl. No.: 17/694,427

(22) Filed: Mar. 14, 2022

(65) Prior Publication Data
US 2022/0301116 A1   Sep. 22, 2022

(30) Foreign Application Priority Data
Mar. 17, 2021   (JP) .................................. 2021-043211

(51) Int. Cl.
G09G 3/20   (2006.01)
G06T 5/00   (2006.01)

(52) U.S. Cl.
CPC .............. *G06T 5/003* (2013.01); *G09G 3/20* (2013.01); *G09G 2320/0626* (2013.01); *G09G 2320/0666* (2013.01); *G09G 2380/10* (2013.01)

(58) Field of Classification Search
CPC ............. G09G 3/20; G09G 2320/0626; G09G 2320/0666; G09G 2380/10; G06T 5/003
See application file for complete search history.

(56) References Cited

U.S. PATENT DOCUMENTS

| | | | |
|---|---|---|---|
| 2011/0193997 A1* | 8/2011 | Hatakeyama | H04N 5/3572 348/241 |
| 2014/0111659 A1* | 4/2014 | Miyasako | H04N 5/23248 348/208.1 |
| 2016/0371820 A1* | 12/2016 | Hiasa | G06T 7/207 |
| 2017/0285326 A1* | 10/2017 | Ishida | G02B 26/105 |
| 2018/0247423 A1* | 8/2018 | Suzuki | G06T 5/50 |
| 2018/0259810 A1* | 9/2018 | Numata | G02F 1/133528 |
| 2018/0261151 A1* | 9/2018 | Chung | G09G 3/20 |
| 2018/0276796 A1* | 9/2018 | Wang | G06T 5/003 |
| 2019/0018250 A1* | 1/2019 | Kasazumi | B60K 35/00 |
| 2020/0084380 A1* | 3/2020 | Kuriyama | G06T 7/90 |
| 2020/0241607 A1* | 7/2020 | Bikumala | G06T 5/003 |
| 2021/0183023 A1* | 6/2021 | Nakajima | H04N 23/6811 |
| 2021/0185231 A1* | 6/2021 | Narita | H04N 23/6812 |
| 2021/0256670 A1* | 8/2021 | Woodall | H04N 23/741 |
| 2021/0264590 A1* | 8/2021 | Milioni De Carvalho | A61B 6/502 |
| 2022/0180483 A1* | 6/2022 | Aoki | G06T 5/003 |
| 2022/0262014 A1* | 8/2022 | Sato | G08B 3/10 |

FOREIGN PATENT DOCUMENTS

JP   2017-013590 A   1/2017

* cited by examiner

*Primary Examiner* — Sejoon Ahn
(74) *Attorney, Agent, or Firm* — Rabin & Berdo, P.C.

(57) ABSTRACT

A head-up display installed in a movable body includes an image acquisition unit that acquires an image including a graphic, a vibration information acquisition unit that acquires vibration information indicating vibration of the moving body, an image correction unit that generates a corrected image by performing, on the image, a blurring correction for blurring a contour of the graphic in the image based on the vibration information, and a display unit that displays the corrected image in a space as a virtual image.

13 Claims, 9 Drawing Sheets

HEAD-UP DISPLAY, VIDEO CORRECTION METHOD, AND VIDEO CORRECTION PROGRAM

CROSS REFERENCE TO RELATED APPLICATION

This application is based upon and claims the benefit of priority of the prior Japanese Patent Application No. 2021-043211, filed on Mar. 17, 2021, the entire contents of which are incorporated herein by reference.

TECHNICAL FIELD

The present invention relates to a video correction device, and more particularly, relates to a head-up display installed in a vehicle, a video correction method, and a program thereof.

BACKGROUND ARTS

In recent years, in moving bodies such as automobiles, a technique such as a head-up display that assists a driver by displaying a virtual image of a digital video over an actual image of a viewable area is known.

For example, Japanese Patent Application Laid-open Publication No. 2017-13590 discloses a head-up display device in which display light representing a display image displayed by a display unit is radiated to the windshield of a user's vehicle such that a virtual image of the display image is displayed over an actual view of the area ahead of the user's vehicle for the user to see. Japanese Patent Application Laid-open Publication No. 2017-13590 also discloses a technique to identify a vertical component of the displacement amount of the user's vehicle caused by vibration based on vibration information when the vehicle vibrates, read out a display position correction amount, and move the display position of a drawn image up or down based on the display position correction amount in a direction opposing to the displacement direction of the user's vehicle. This way, it is possible to reduce discomfort felt by the user due to the virtual image being displaced when the user's vehicle vibrates.

SUMMARY OF THE INVENTION

Problems to be Solved by the Invention

However, if a correction to move the display position of the virtual image is to be performed every time the vehicle experiences vibration, a greater load would be imposed on a semiconductor device performing the correction process, for example, and as a result, the processing speed could slow down. In order to keep the processing speed from slowing down, it is necessary to install a large semiconductor device, but this would increase the device size and also create a need for a solution to overheating.

The present invention was made in view of the above problems, and an object thereof is to provide a head-up display, a video correction method, and a video correction program that can reduce discomfort of a driver caused by virtual images being displaced when the vehicle vibrates, through simple configuration and processing.

A head-up display according to the present invention is a head-up display installed in a body capable of moving, hereinafter "moving body," including: an image acquisition unit that acquires an image including a graphic; a vibration information acquisition unit that acquires vibration information indicating vibration of the moving body; an image correction unit that generates a corrected image by performing, on the image, a blurring correction for blurring a contour of the graphic of the image based on the vibration information; and a display unit that displays the corrected image in a space as a virtual image.

A video correction method according to the present invention is a video correction method for a head-up display installed in a moving body and including a display unit that displays a corrected image in a space as a virtual image, the method including: an image acquisition step for acquiring an image including a graphic; a vibration information acquisition step for acquiring vibration information that indicates vibration of the moving body; and an image correction step for generating a corrected image by performing, on the image, a blurring correction for blurring a contour of the graphic in the image based on the vibration information.

A video correction program according to the present invention causes a computer installed in a head-up display that is installed in a moving body and that includes a display unit displaying a corrected image in a space as a virtual image to perform: an image acquisition step for acquiring an image including a graphic; a vibration information acquisition step for acquiring vibration information that indicates vibration of the moving body; and an image correction step for generating a corrected image by performing, on the image, a blurring correction for blurring a contour of the graphic in the image based on the vibration information.

DETAILED DESCRIPTION OF EMBODIMENTS

Below, embodiments of the present invention will be explained in detail with reference to figures. In the descriptions of respective embodiments below and appended diagrams, the same reference characters are given to parts that are substantially the same as each other or equivalent to each other.

Embodiment 1

Below, a head-up display (referred to as HUD hereinafter) 10 of Embodiment 1 of the present invention will be explained with reference to the appended figures. In Embodiment 1, an example where the HUD 10 is installed in an automobile M will be explained.

Figure 1:
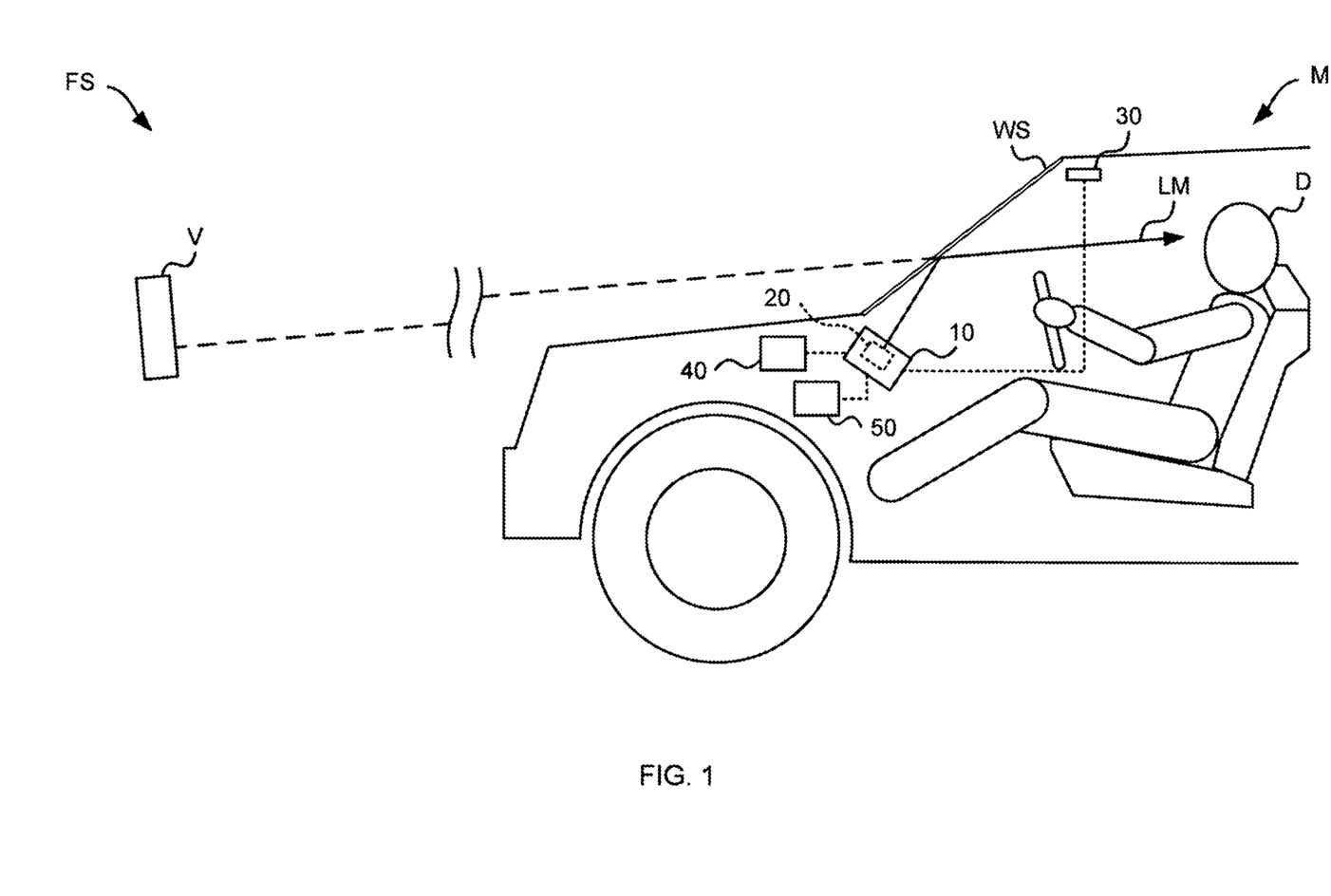
FIG. 1 is a diagram illustrating a side face of the front part of an automobile that is a vehicle equipped with a HUD of Embodiment 1 of the present invention.

FIG. 1 is a diagram illustrating a side face of the front part of the automobile M that is a vehicle equipped with the HUD 10 of Embodiment 1 of the present invention. FIG. 1 shows an installation example in which the HUD 10 is attached to the instrumental panel of the automobile M. That is, the HUD 10 is a head-up display installed in the automobile M, which is an example of a movable body: that is, a body that can be stationary, but when being driven, for example, is a moving body.

The HUD 10 includes a light projection unit 20 that is a display unit. The light projection unit 20 is connected to the HUD 10 such that they can communicate with each other, and by projecting display light LM to a windshield WS in accordance with the control of the HUD 10, for example, a virtual image V is displayed in a target space FS for a driver D to see. The light projection unit 20 may employ digital light processing (DLP) using a MEMS (micro-electro mechanical systems) mirror, or a light projection method such as laser scanning. That is, the light projection unit 20 may have any configuration as long as it can project the display light LM, which represents an image to be displayed as the virtual image V, onto the windshield WS, such that the virtual image V becomes visible to the driver D by the display light LM reflected on the windshield WS.

The light projection unit 20 may alternatively be a display device such as a liquid crystal display device or an organic EL display that can display videos, for example, instead of having the configuration to project the display light LM to the windshield WS.

An in-vehicle camera 30 is a camera that can capture images of the area ahead of the automobile M (target space FS), for example. The in-vehicle camera 30 is installed in a rear-view mirror, at the top of the windshield SW, or at the ceiling near the top of the windshield SW. The in-vehicle camera 30 is connected to the HUD 10 such that they can communication with each other, and is able to send signals representing a captured video to the HUD 10. The camera 30 needs to be placed at a position that allows it to photograph at least the space where the virtual image V is generated, or in other words, the area ahead of the automobile M. The in-vehicle camera 30 may be installed at the front grille or at each of the side mirrors of the automobile M in a way that allows it to photograph the target space FS.

A GPS receiver 40 is a device that receives signals (GPS signal) from the GPS (global positioning system) satellite. The GPS receiver 40 is disposed on a dashboard, for example. The GPS receiver 40 may be located anywhere as long as it can receive the GPS signal. The GPS receiver 40 is connected the HUD 10 such that they can communication with each other, and is able to send the received GPS signals to the HUD 10. The HUD 10 works with the GPS receiver 40 and achieves navigation functions including route-finding and route directions.

The HUD 10 identifies information such as white lines and a center divider indicating the traffic lane in which the automobile M is currently driving, information regarding a vehicle driving ahead, and information regarding pedestrians who are walking in front of the automobile M, based on the video of the target space FS acquired by the in-vehicle camera 30. The HUD 10 displays a virtual image V representing such information over the actual image of the target space FS viewed by the driver D, such that the virtual image V can be perceived by the driver D.

Examples of the images displayed as the virtual image V by the HUD 10 include an image containing graphics that represent a white line mark emphasizing the white lines, a vehicle mark emphasizing a vehicle driving ahead, a distance from the vehicle driving ahead, and a pedestrian mark emphasizing a pedestrian who is walking in front of the automobile M. The image displayed as the virtual image V by the HUD 10 also includes graphics that represent directions given by the navigation function, which are route direction arrow marks indicating straight ahead, a right turn, or a left turn, a distance to go, and estimated time of arrival, for example.

The vibration sensor 50, which is the vibration information acquisition unit, is a sensor that detects vibration information of the automobile M while driving. The vibration sensor 50 includes, for example, an acceleration sensor or a gyro sensor, and detects vibration information including the vibration direction, vibration amount, and vibration frequency of the automobile M while the automobile M is moving. The vibration information of the automobile M is, for example, information including vertical vibration information including the amplitude and frequency of vibration in the vertical direction and horizontal vibration information including the amplitude and frequency of vibration in the horizontal direction. Here, the vertical direction means the direction of a plumb line that points in the direction of gravity, for example. The horizontal direction is the direction perpendicular to the direction of a plumb line, for example.

The vibration sensor 50 is connected to the HUD 10 such that they can communicate with each other, and is able to send the detected vibration information to the HUD 10. The vibration sensor 50 may be placed inside the housing of the HUD 10. The virtual image V displayed by the HUD 10 shakes when the light projection unit 20 vibrates due to the vibration of the automobile M, and the projection position of the windshield WS of the display light LM keeps changing. By placing the vibration sensor 50 near the light projection unit 20, the vibration sensor 50 can acquire vibration information approximate to vibration of the light projection unit 20. In other words, the HUD 10 includes the vibration sensor 50 as a vibration information acquisition unit that acquires vibration information indicating vibration of the automobile M. The vibration information includes horizontal vibration information for vibration in the horizontal direction and vertical vibration information for vibration in the vertical direction.

The HUD 10 performs a correction, which will be described later, on the image to be displayed as a virtual image V on the basis of the vibration information received from the vibration sensor 50. This way, even if a mismatch between the actual image of the area ahead and the virtual image V is caused by the vibration of the automobile M, the HUD 10 can correct the mismatch visually, and therefore reduce discomfort felt by the driver D.

Figure 2:
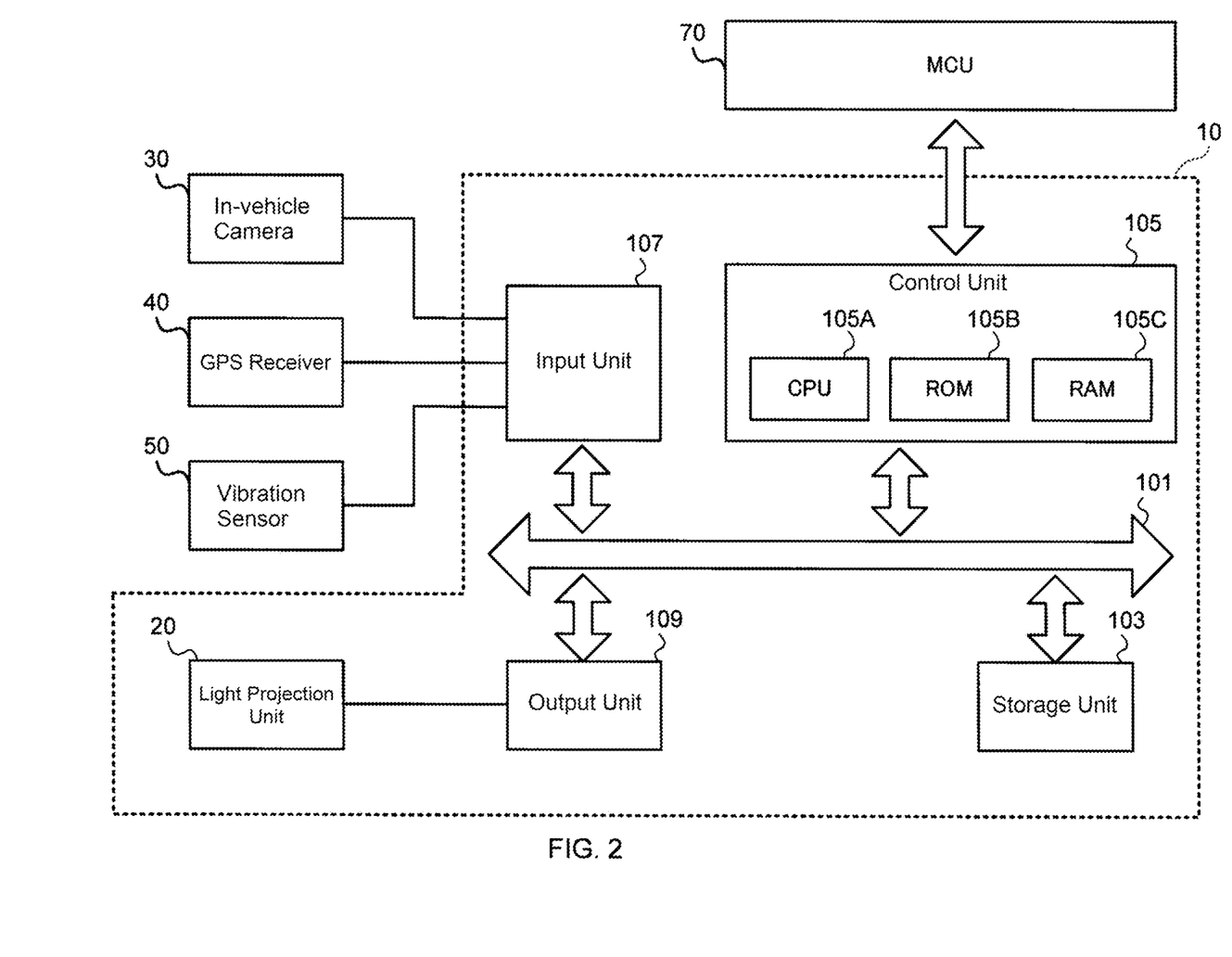
FIG. 2 is a block diagram illustrating the configuration of the HUD of Embodiment 1 of the present invention.

FIG. 2 is a block diagram illustrating the configuration of the HUD 10 of Embodiment 1 of the present invention. The HUD 10 is a device in which a storage unit 103, a control unit 105, an input unit 107, and an output unit 109 cooperate with each other via a system bus 101, for example. The control unit 105 of the HUD 10 is connected to an MCU (micro controller unit) 70.

The MCU 70 is a control unit that controls the entire HUD 10. The MCU 70 controls start/stop of the operations of the HUD 10, operation timings of the processes performed by the control unit 105 of the HUD 10, and the like.

The storage unit 103 is constituted of a hard disk device, an SSD (solid-state drive), or a flash memory, and stores therein various programs such as an operation system and device software. The storage unit 103 also stores therein an image including graphics to be displayed as the virtual image V, and map information used for the navigation function. The various programs, images and map information may be acquired from other server devices and the like via a network, for example, or may be stored in storage media and loaded via various drives. That is, the various programs stored in the storage unit 103 (including the programs for executing processes in the HUD 10 described later) may be transmitted via a network, or may be recorded and transferred in a computer readable storage medium.

The control unit 105 is constituted of a CPU (Central Processing Unit) 105A, a ROM (Read Only Memory) 105B, a RAM (Random Access Memory) 105C, and the like, and functions as a computer. The CPU 105A realizes multiple functions by reading and executing various programs stored in the ROM 105B and the storage unit 103.

The input unit 107 is an interface unit that connects the HUD 10 with the in-vehicle camera 30, the GPS receiver 40, and the vibration sensor 50 such that they can communicate with each other. The HUD 10 can receive, via the input unit 107, the front view image of the automobile M from the in-vehicle camera 30, the current position information of the automobile M from the GPS receiver 40, and the vibration information of the automobile M from the vibration sensor 50. In Embodiment 1, a case in which a video captured by the in-vehicle camera 30 are directly inputted into the HUD 10 will be explained. In this case, the CPU 105A of the control unit 105 generates video data from the information of the video signal transmitted from the in-vehicle camera 30, and successively writes or reads data blocks including the video data to or from the RAM 105C. However, the HUD 10 may include a graphic generation unit that generates video data from the information of the video signal transmitted from the in-vehicle camera 30 between the in-vehicle camera 30 and the input unit 107. In this case, the HUD 10 accepts video data successively from the graphic generating unit, writes data blocks including the video data into the RAM 105C, and reads out the written data blocks successively. This makes it possible to reduce the load on the control unit 105 of the HUD 10.

The output unit 109 is connected to the light projection unit 20 such that they can communicate with each other, and by sending signals representing an image to be displayed as the virtual image V to the light projection unit 20, the light projection unit 20 projects display light LM, and the virtual image V is therefore displayed in the target space FS.

The control unit 105 also reads out from the storage unit 103 an image including graphics such as a white line mark, a vehicle ahead mark, a distance to the vehicle ahead, a pedestrian mark, a route direction arrow mark, and the like, which are to be displayed in the virtual image V. This time, the control unit 105 functions as the image acquisition unit.

The control unit 105 also generates a corrected image to be displayed by the light projection unit 20 as the virtual image V based on the read-out image, and sends signals representing this corrected image to the light projection unit 20 via the output unit 109. The light projection unit 20 projects the received signals of the corrected image to the windshield WS as the display light LM, so that the corrected image is perceived by the driver D as the virtual image V.

In generating a corrected image, the control unit 105 performs a correction process on the graphics in the image read out from the storage unit 103 based on the vibration information received from the vibration sensor 50. Specifically, the control unit 105 generates a corrected image by blurring the contour of the graphic included in the image in accordance with the vibration amounts in the vertical direction and in the horizontal direction based on the vibration information received from the vibration sensor 50. This time, the control unit 105 functions as the image correction unit of the HUD 10.

Next, with reference to FIGS. 3 and 4, the correction process of the HUD 10 of Embodiment 1 of the present invention will be explained.

Figure 3:
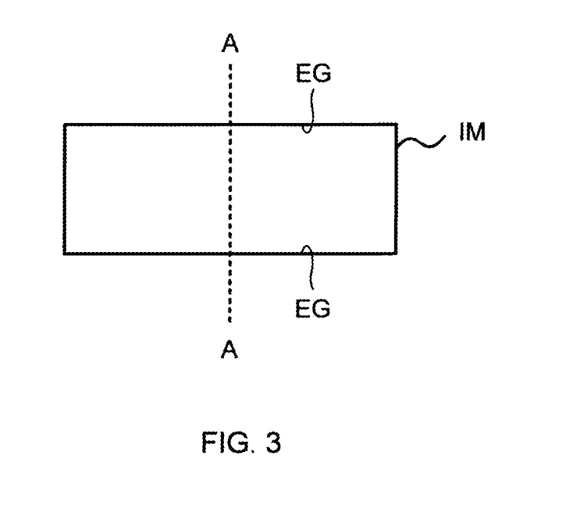
FIG. 3 is a diagram illustrating an example of a graphic before a correction process is performed in the HUD of Embodiment 1 of the present invention.

FIG. 3 is a diagram illustrating an example of a graphic IM before the correction process is performed in the HUD 10 of Embodiment 1 of the present invention. In this embodiment, a case where the correction is performed on the rectangular graphic IM will be explained as illustrated in FIG. 3. Also, in this embodiment, a case where the correction is made on the vibration in the vertical direction of FIG. 3 (direction along the line A-A) will be explained.

Figure 4:
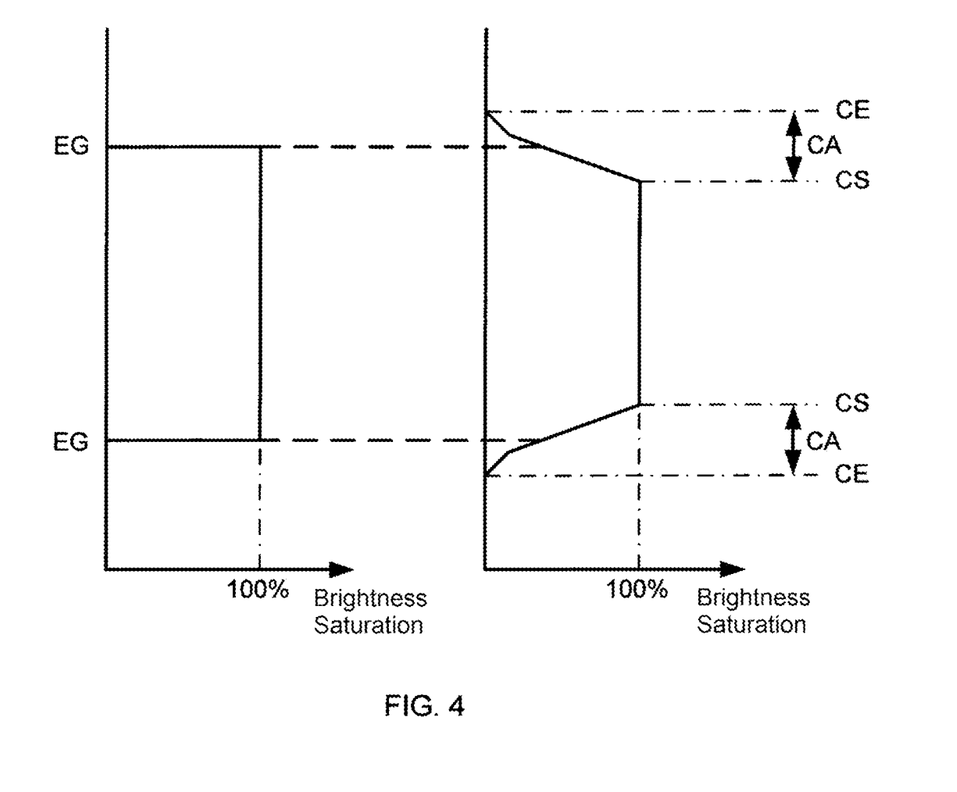
FIG. 4 is a graph showing the intensity distribution of brightness and saturation before and after the correction process is performed at the line A-A in the graphic of FIG. 3.

FIG. 4 is a graph showing the intensity distribution of brightness and saturation before and after the correction process is performed at the line A-A of the graphic IM of FIG. 3. The vertical axis of FIG. 4 corresponds to the line A-A, and the horizontal axis is the intensity of the brightness and saturation of the corrected image displayed as the virtual image V. The left-hand side of FIG. 4 illustrates the intensity distribution of brightness and saturation before the correction process is performed, and the right-hand side illustrates the intensity distribution of brightness and saturation after the correction process is performed.

The brightness distribution at the line A-A of the graphic IM before the correction is performed is uniform within the display region enclosed by the contour EG. That is, in the graphic IM before the correction is performed, the brightness and saturation intensity within the display region is uniformly 100%, and the brightness and saturation intensity outside of the display region is uniformly 0%.

When the graphic IM with such a clear contour EG is projected as the virtual image V, the shaking (vibration) of the contour EG is intermittently displayed in accordance with the vibration frequency of the automobile M. Therefore, when the graphic IM before the correction process is displayed as the virtual image V, the lines of the graphics in the virtual image V might look wider, or flickering might occur around the contour EG. This causes the graphic in the virtual image V to look mismatched with the graphic IM to the driver D, who feels discomfort as a result.

That is, if the virtual image V that causes a sense of discomfort to the driver D is displayed, then the visibility of the virtual image V would degrade, and because the driver D might have to focus on the virtual image V, or might not be able to recognize the information indicated by the virtual image V, the safety of the driver can be compromised.

In the HUD 10 of Embodiment 1 of the present invention, as illustrated in the right-hand side of FIG. 4, a blurring correction area CA is formed around the contour EG within the display area defined by the contour EG. The control unit 105 performs a correction to gradually reduce the brightness and saturation of the graphic IM from the correction starting point CS within the display region of the blurring correction area CA to a correction end point CE outside the display region. That is, the control unit 105 generates a corrected image by performing, on the graphic IM, a process to gradually reduce the brightness and saturation around the contour EG to blur the contour EG.

The brightness and saturation reduced in this process is the YCbCr color space, for example. Specifically, the control unit 105 gradually reduces the brightness (Y) from the value possessed by the graphic IM to zero, as it moves from the correction starting point CS to the correction end point CE. Also, at the same time, the control unit 105 performs a correction process to move the saturation (CbCr) from the value possessed by the graphic IM to the origin (Cb=0, Cr=0) linearly on the CbCr color space. That is, in the virtual image V displayed with the graphic IM after the correction process is performed, the brightness gradually reduces, and the saturation gradually lowers starting from the display region toward the outside of the contour EG of the virtual image V.

The control unit 105 sets the position of the correction starting point CS to a point inside the contour EG of the graphic IM to be further away from the contour EG for a prescribed proportion in accordance with the amplitude of the vibration along the correction direction, for example. That is, the greater the amplitude of the vibration is, the further into the graphic IM the correction starting point CS is. The position of the correction starting point CS may appropriately be determined. For example, the control unit 105 may set the position of the correction starting point CS to a point inside the contour EG at a distance corresponding to 50% of the amplitude of the vibration. Alternatively, the control unit 105 may set the position of the correction starting point CS to a point inside the contour EG at a distance corresponding to a certain percentage of the amplitude of the vibration. The position of the correction starting point CS may be set freely as long as a good visibility of the virtual image V is achieved after the correction process.

Also, in a manner similar to the position of the correction starting point CS, the control unit 105 sets the position of the correction end point CE to a point outside the contour EG to be further away from the contour EG, corresponding to a certain percentage of the amplitude of the vibration along the correction direction, for example. That is, the greater the amplitude of the vibration is, the further away from the graphic IM the correction end point CE is. The position of the correction end point CE may appropriately be determined. For example, the control unit 105 may set the position of the correction end point CE to a point outside the contour EG at a distance corresponding to 50% of the amplitude of the vibration, or to a point outside the contour EG at a distance corresponding to a certain percentage of the amplitude of the vibration. Additionally, the control unit 105 may be adjusted such that the position of the correction end point CE does not overlap the display region of another graphic in accordance with the shape and display position of the graphic, but needs to be set such that good visibility of the virtual image V is ensured after the correction process.

In Embodiment 1, the brightness and saturation are reduced in two stages, which are a section where the brightness and saturation are reduced drastically, and a section where the brightness and saturation are reduced gradually in the blurring correction region CA. This makes it possible to ensure good visibility of the virtual image V after the correction process. The method to reduce the brightness and saturation is not limited to this. The brightness and saturation may be reduced linearly from the correction starting point CS to the correction end point CE, or may be reduced in a plurality of stages. Alternatively, the brightness and saturation may be reduced curvedly from the correction starting point CS to the correction end point CE.

In this embodiment, a case where the size of the correction area CA is changed in accordance with the amplitude of vibration was explained. However, the size of the correction area CA may alternatively be changed in accordance with the frequency of vibration. For example, if the frequency of vibration is low and the control unit 105 determines that the vibration would not affect the perception of the driver D, the control unit 105 may reduce the size of the correction area CA or may skip the correction process.

Figure 5:
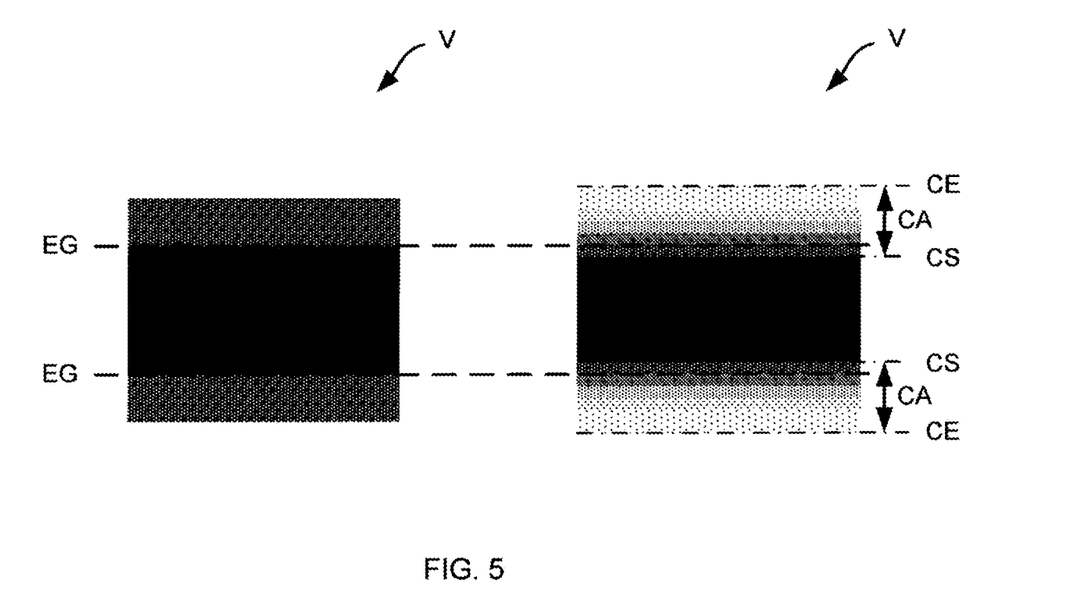
FIG. 5 is a diagram illustrating an example of how the graphic is perceived as a virtual image before and after the correction process is performed in the HUD of Embodiment 1 of the present invention.

FIG. 5 is a diagram illustrating an example of how the graphic IM is perceived when displayed as the virtual image V before and after the correction process is performed. In a manner similar to FIG. 3, in FIG. 5, a case where the correction is made on the vibration acting in the direction along the line A-A will be explained. The figure on the left-hand side of FIG. 5 illustrates the appearance of the graphic IM when displayed as the virtual image V before the correction process is performed, and the figure on the right-hand side of FIG. 5 illustrates the appearance of the graphic IM when displayed as the virtual image V after the correction process is performed. In the figure on the right-hand side of FIG. 5, the respective perceived areas appear to be displayed in a step-like manner, but in actuality, the brightness and saturation are gradually reduced from the correction starting point CS to the correction end point CE, perceived as a gradient area.

In the graphic IM displayed as the virtual image V before the correction process is performed on the left-hand side of FIG. 5, the shaking of the contour EG is perceived due to vibration of the automobile M in an area outside the contour EG as described above. This shaking is perceived as flickering in accordance with the frequency of vibration of the automobile M. Thus, the graphic IM displayed as the virtual image V before the correction process is performed has poor visibility as illustrated on the left-hand side of FIG. 5.

On the right-hand side of FIG. 5, the graphic IM after the correction process has been corrected by gradually lowering the brightness and saturation around the contour EG for the blurring effect as described above. Thus, in the graphic IM displayed as the virtual image V after the correction process is performed, a gradient area appears from the correction starting point CS of the blurring correction area CA inside the contour EG toward an area outside the contour EG. Thus, unlike the figure on the left-hand side of FIG. 5, the shaking is not perceived, and the outer edge of the bluffing of the contour EG is not easily identified. Thus, as illustrated on the right-hand side of FIG. 5, the graphic IM has very high visibility. As a result, it is possible to mitigate the shaking of the virtual image V caused by the vibration of the automobile M.

In Embodiment 1, the correction process to gradually reduce the brightness and saturation around the contour of the graphic so the contour is blurred out in accordance with vibration of the automobile M is performed on the image that includes graphics to be displayed as the virtual image. This way, it is possible to suppress the degradation of visibility due to shaking of the virtual image V caused by vibration of the automobile M and thus reduce the level of discomfort felt by the driver D.

FIGS. 3 to 5 of Embodiment 1 illustrate a case where the correction was made only for vibration in the vertical direction. However, as described above, a similar correction process is also performed for vibration in the horizontal direction.

Figure 6:
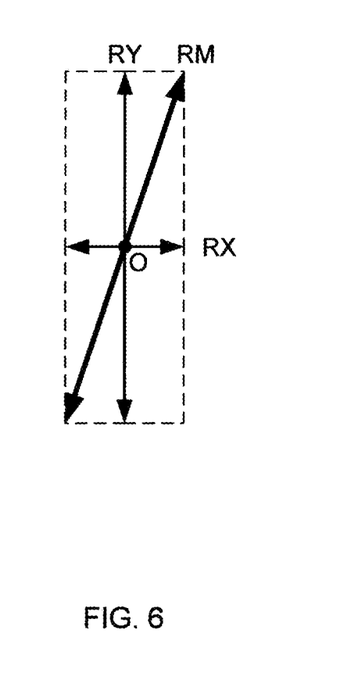
FIG. 6 is a diagram illustrating vibration detected by a vibration sensor of the HUD of Embodiment 1 of the present invention and vibration directions when the vibration is separated into horizontal vibration and vertical vibration.

FIG. 6 is a diagram illustrating vibration RM detected by the vibration sensor 50, and the vibration directions when the vibration RM is separated into horizontal vibration RX and vertical vibration RY.

As illustrated in FIG. 6, the vibration RM having a gradient can be separated into the horizontal vibration RX and the vertical vibration RY using an accelerometer, gyroscope, and the like included in the vibration sensor 50. The control unit 105 performs, on the contour of a graphic in an image read out from the storage unit 103, a blurring correction process for the horizontal direction in accordance with the vibration amount of the horizontal vibration RX and a blurring correction process for the vertical direction in accordance with the vibration amount of the vertical vibration RY. That is, for the horizontal vibration as well, the visibility of the graphic of the virtual image V can be improved. This way, even when vibration occurs when the automobile M is tilted from driving on a curved road, or even when vibration occurs due to high winds, it is possible to suppress the degradation of visibility due to shaking of the virtual image V and thus reduce the level of discomfort felt by the driver D.

In Embodiment 1, the blurring correction in which the brightness and saturation are gradually reduced around the contour EG of the graphic IM when displayed as the virtual image V was explained. However, in the correction process to blur the contour EG, it is also possible to change the brightness only. That is, the contour EG of the graphic IM can also be blurred by gradually reducing the brightness in the blurring correction area CA. This way, it is possible to suppress the degradation of visibility due to shaking of the virtual image V caused by vibration of the automobile M and thus reduce the level of discomfort felt by the driver D.

Below, an example of an operation routine of the HUD 10 to display the virtual image V will be explained.

Figure 7:
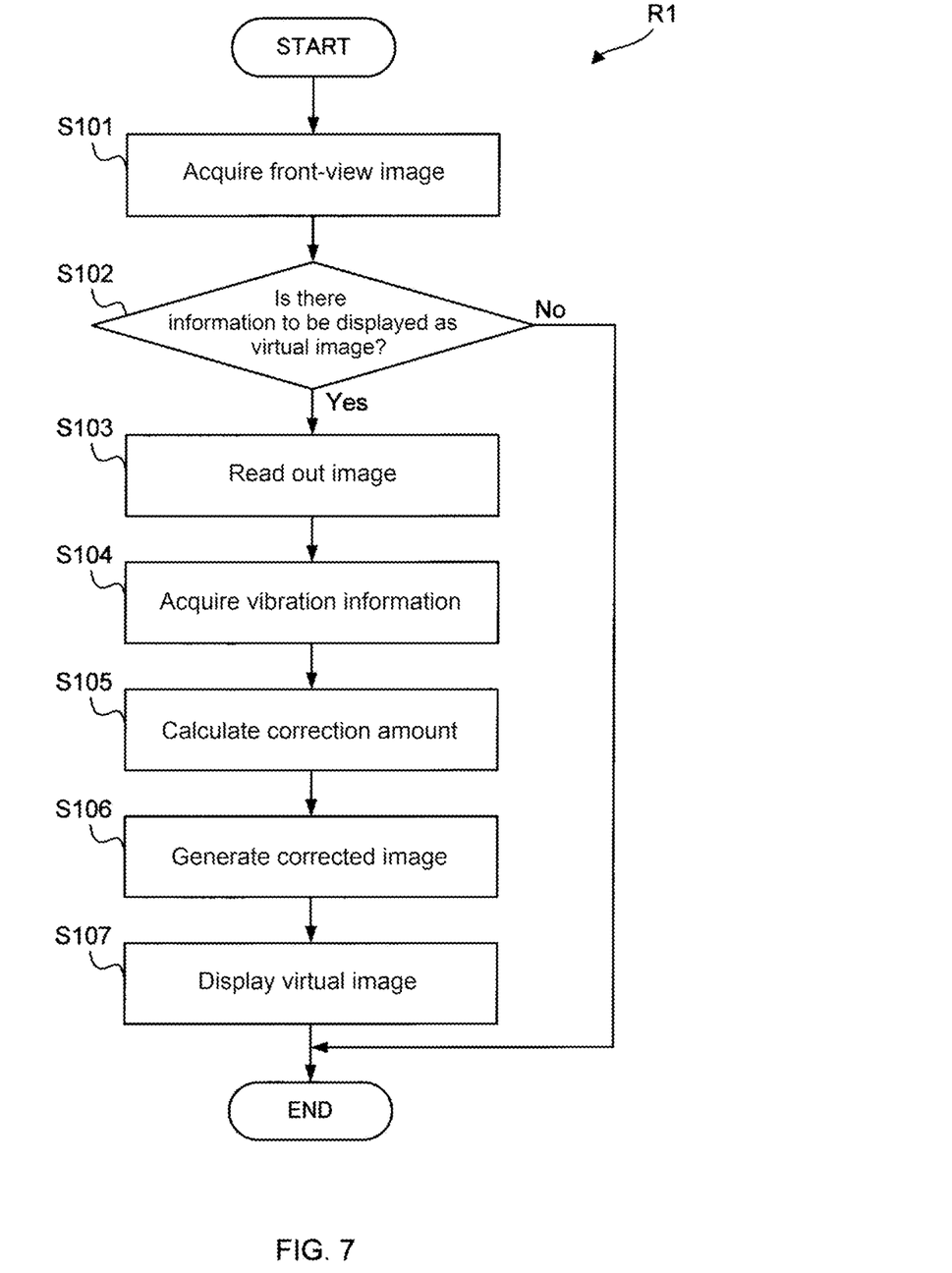
FIG. 7 is a diagram illustrating a virtual image display routine as an example of an operation routine of the HUD of Embodiment 1 of the present invention.

FIG. 7 is a diagram illustrating a virtual image display routine R1 as an example of the operation routine of the HUD 10 of Embodiment 1 of the present invention. The virtual image display routine R1 is repeatedly performed after the HUD 10 is turned on, for example.

When the virtual image display routine R1 is started, the control unit 105 acquires, from the in-vehicle camera 30, a front view image of the automobile M captured by the in-vehicle camera 30, which is the target space FS where the virtual image V is to be displayed (Step S101).

Next, the control unit 105 identifies the white lines indicating traffic lanes, other vehicles driving ahead of the automobile M, pedestrians walking in front of the automobile M, and the like from the front view image of the automobile M, and determines whether there is information to be displayed as the virtual image V in the target space FS of the automobile M (Step S102). At this time, the route directions indicating a right turn, a left turn, or straight ahead provided by the navigation function that works together with the GPS receiver 40 described above are also identified as the information to be displayed as the virtual image V in the target space FS of the automobile M.

In Step S102, if the control unit 105 determines that the front view image does not include information to be displayed in the target space FS of the automobile M (Step S102: No), the control unit 105 ends and restarts the virtual image display routine R1. That is, the control unit 105 acquires a front view image of the automobile M from the in-vehicle camera 30 as needed by repeating the process of Step S101, and determines whether there is information to be displayed as the virtual image V in the target space FS of the automobile M or not.

In Step S102, if the control unit 105 determines that the front view image does include information to be displayed in the target space FS of the automobile M (Step S102: Yes), the control unit 105 performs an image acquisition step in which an image including the graphic IM corresponding to that information is read out from the storage unit 103 (Step S103). In other words, the video correction method of the HUD 10 includes an image acquisition step for acquiring an image including a graphic.

Next, the control unit 105 performs a vibration information acquisition step in which vibration information of the automobile M is acquired from the vibration sensor 50 (Step S104). In other words, the video correction method of the HUD 10 includes a vibration information acquisition step for acquiring vibration information that indicates vibration of a moving body.

Next, the control unit 105 calculates an amount of correction performed on the graphic IM included in the image based on the vibration information acquired from the vibration sensor 50. In this embodiment, the amount of correction means the size of the blurring correction area CA in the blurring correction. In this step, the control unit 105 separates the vibration RM, which is the vibration information acquired from the vibration sensor 50, into the horizontal vibration RX and the vertical vibration RY as illustrated in FIG. 6. The control unit 105 calculates the respective blurring correction areas CA in the horizontal direction and the vertical direction with respect to the contour EG of the graphic IM based on the respective amplitudes of the horizontal vibration RX and vertical vibration RY.

Next, the control unit 105 generates a corrected image in which the contour EG of the graphic IM has undergone the correction process to blur the contour EG (Step S106). The correction performed on the graphic IM is to blur the contour EG by gradually reducing the brightness and saturation toward the outside of the graphic IM within the respective horizontal and vertical blurring correction areas CA calculated in Step S105.

That is, Steps S105 and S106 function as an image correction step in the virtual image display routine R1. In other words, the video correction method of the HUD 10 includes an image correction step for generating a corrected image by performing a blurring correction on an image to blur the contour of the graphic IM included in the image based on the vibration information.

Next, the control unit 105 supplies the generated corrected image to the light projection unit 20 via the output unit 109, causes the light projection unit 20 to output the display light LM of the corrected image, and displays the virtual image V (Step S107).

By repeating the process of the virtual image display routine R1 described above, the HUD 10 can display the virtual image V with good visibility according to the vibration direction and the vibration amount of the automobile M. That is, the virtual image display routine R1 is a video correction method of a head-up display that is installed in a moving body and that includes the light projection unit 20 displaying a corrected image in a space as the virtual image V.

According to Embodiment 1, the HUD 10 can suppress the degradation of visibility due to shaking of the virtual image V caused by vibration of the automobile M through the relatively simple configuration and correction process described above, and reduce the level of discomfort felt by the driver D.

As described above, the virtual image display routine R1 is recorded in the storage unit 103 as a software program of the HUD 10, and is loaded to and executed by the CPU 105A, ROM 105B, and RAM 105C that constitute the control unit 105. Additionally, this program may be recorded and transferred in a computer-readable storage medium. That is, the virtual image display routine R1 is a video correction program that causes a computer provided in the HUD 10, which is installed in the automobile M i.e., a moving body, and includes the light projection unit 20, i.e., a display unit, displaying a corrected image in a space as the virtual image V, to execute the image acquisition step for acquiring an image including the graphic IM, the vibration information acquisition step for acquiring vibration information indicating vibration of the automobile M, and the image correction step for generating a corrected image by performing a blurring correction on the image to blur the contour of the graphic IM in the image based on the vibration information. The virtual image display routine R1 is a computer-readable recording medium that stores therein the video correction program of the virtual image display routine R1.

Embodiment 2

In Embodiment 1, a case where the correction process is performed to gradually reduce the brightness and saturation around the contour EG of the graphic IM in order to improve visibility of the virtual image V was explained. However, the correction process for the graphic IM is not limited to this. In a second aspect of the present invention, in order to improve the visibility of the virtual image V, the brightness and saturation may be increased in part of the display region to emphasize the display of the virtual image V, for example.

Figure 8:
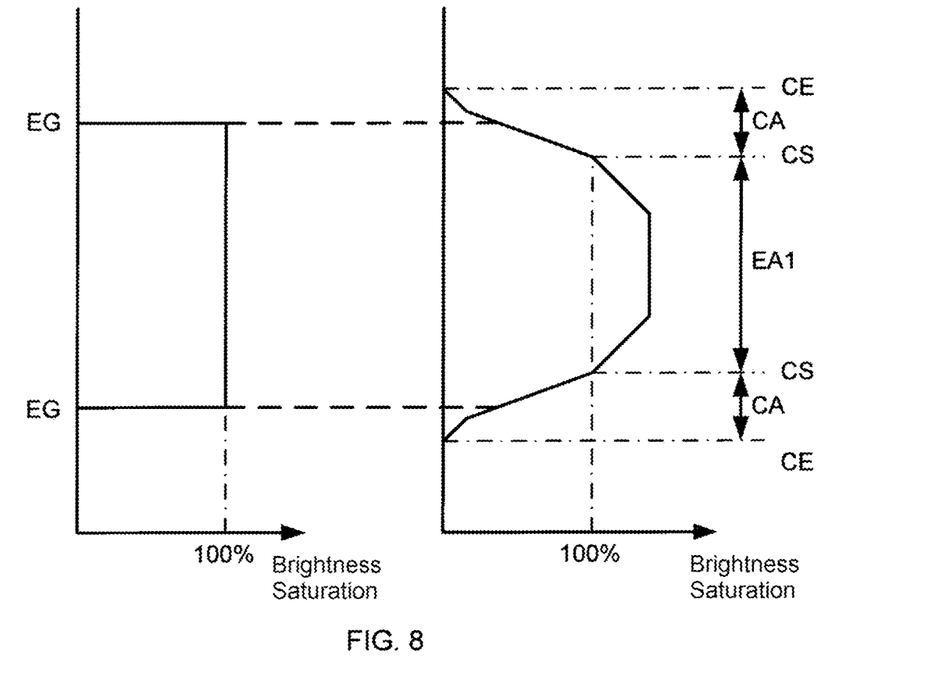
FIG. 8 is a graph showing the intensity distribution of brightness and saturation before and after the correction process is performed in a HUD of Embodiment 2 at the line A-A in the graphic of FIG. 3.

FIG. 8 is a graph showing the intensity distribution of the brightness and saturation before and after the correction process is performed in the HUD 10 of Embodiment 2, as the second aspect of the present invention, at the line A-A of the graphic IM of FIG. 3. In a manner similar to that illustrated in FIG. 4, in FIG. 8, the vertical axis corresponds to the line A-A, and the horizontal axis is the intensity of the brightness and saturation of the image when displayed as the virtual image V. The left-hand side of FIG. 8 illustrates the intensity distribution of brightness and saturation in the graphic IM before the correction process is performed, and the right-hand side illustrates the intensity distribution of brightness and saturation after the correction process is performed. The brightness and saturation intensity distribution in the graphic IM before the correction process is performed, which is illustrated on the left-hand side of FIG. 8, is similar to that shown on the left-hand side of FIG. 4, and thus, the explanation thereof will be omitted. The configuration of the HUD 10 of Embodiment 2 is similar to that of Embodiment 1. Embodiment 1 differs from Embodiment 2 only in the steps of the correction process, and thus, the explanation of the configuration of the HUD 10 will be omitted.

In the brightness and saturation intensity distribution in the corrected image after the correction process is performed illustrated on the right-hand side of FIG. 8, the size of the blurring correction area CA and the correction method within the blurring correction area CA are similar to those of Embodiment 1. In Embodiment 2, the control unit 105 forms an emphasis correction area EA1 in a section between the respective blurring correction areas CA of the contour EG. In the emphasis correction area EA1, the control unit 105 performs an emphasis correction to gradually increase the brightness and saturation from the outer edge of the emphasis correction area EA1 toward the center of the graphic IM in accordance with the amplitude of vibration. In other words, the control unit 105, i.e., the image correction unit, further performs an emphasis correction on the graphic IM to emphasize a part of the graphic IM based on the vibration information. Also, the control unit 105, i.e., the image correction unit, performs the emphasis correction by gradually increasing the brightness and saturation of the graphic IM toward the center of the graphic to emphasize a part of the graphic IM based on the vibration information.

In a manner similar to Embodiment 1, Embodiment 2 illustrates a case where the correction was applied to only the vertical vibration. However, as described above, a similar correction process is also performed for vibration in the horizontal direction. In other words, the control unit 105, i.e., the image correction unit, performs the emphasis correction by changing the brightness and saturation in the horizontal direction of the graphic IM based on the horizontal vibration information, and changing the brightness and saturation in the vertical direction of the graphic IM based on the vertical vibration information.

The brightness and saturation increased in this process is the YCbCr color space, for example. Specifically, the control unit 105 gradually increases the brightness (Y) from the value possessed by the graphic IM, starting from the correction starting point CS toward the correction end point CE in the bluffing correction area CA. Also, at the same time, the control unit 105 performs a correction process to move the saturation (CbCr) further away from the origin on the line that runs through the value held by the graphic IM and the origin (Cb=0, Cr=0) on the CbCr color plane. That is, in the virtual image V displayed by the graphic IM that has undergone the correction process, the brightness increases, and the saturation gradually increases starting from the display region toward the outside of the contour EG of the virtual image V.

Further, the control unit 105 increases the maximum values of the brightness and saturation in the emphasis correction area EA1 by a certain ratio according to the amplitude of vibration from the brightness and saturation originally held by the graphic IM, for example. That is, the greater the amplitude of the vibration is, the more strongly the emphasis correction area EA1 of the graphic IM is emphasized. The maximum values of the brightness and the saturation within the emphasis correction area EA1 may appropriately be determined. For example, the maximum values of the brightness and saturation within the emphasis correction area EA1 may be increased by a prescribed value according to the amplitude of vibration from the YCbCr value held by the graphic IM. The maximum values of the brightness and saturation within the emphasis correction area EA1 may be set to any values as long as good visibility of the virtual image V is achieved after the correction process.

Figure 9:
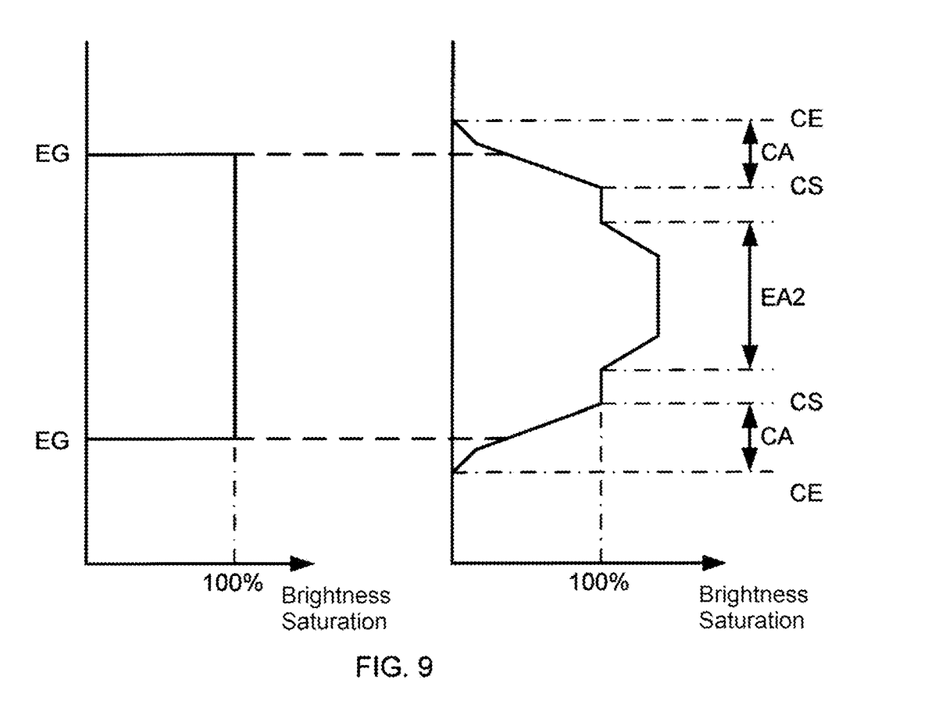
FIG. 9 is a graph showing the intensity distribution of brightness and saturation before and after the correction process is performed in the HUD of Embodiment 2 at the line A-A in the graphic of FIG. 3.

Also, as illustrated on the right-hand side of FIG. 9, in the graphic IM displayed as the virtual image V, only a part including the center thereof may be emphasized. For example, an emphasis correction area EA2 may be set in an area of the graphic IM, corresponding to a prescribed ratio of the width along the correction direction of the graphic IM in accordance with the amplitude of vibration, and the correction process may be performed such that the brightness and saturation increase gradually starting from the outer edge of the emphasis correction area EA2 toward the center of the graphic IM.

According to Embodiment 2, the HUD 10 forms the emphasis correction area EA1 or EA2 between the blurring correction areas CA in the center portion of the display region, and increases the brightness and saturation in the emphasis correction area. The HUD 10 emphasizes a part of the center portion of the graphic IM (or in other words, an area around the emphasis correction area EA1 or EA2) by making the brightness and saturation of the correction starting point CS relatively low, to further improve the visibility of the graphic IM. Also, by performing the correction process to emphasize a part of the center area of the graphic IM, it is possible to further improve the visibility of graphics including a relatively thin straight line such as the white line mark, and the numbers or texts indicating a distance to the vehicle ahead, a distance to the next left/right turn in navigation, and the like.

Figure 10:
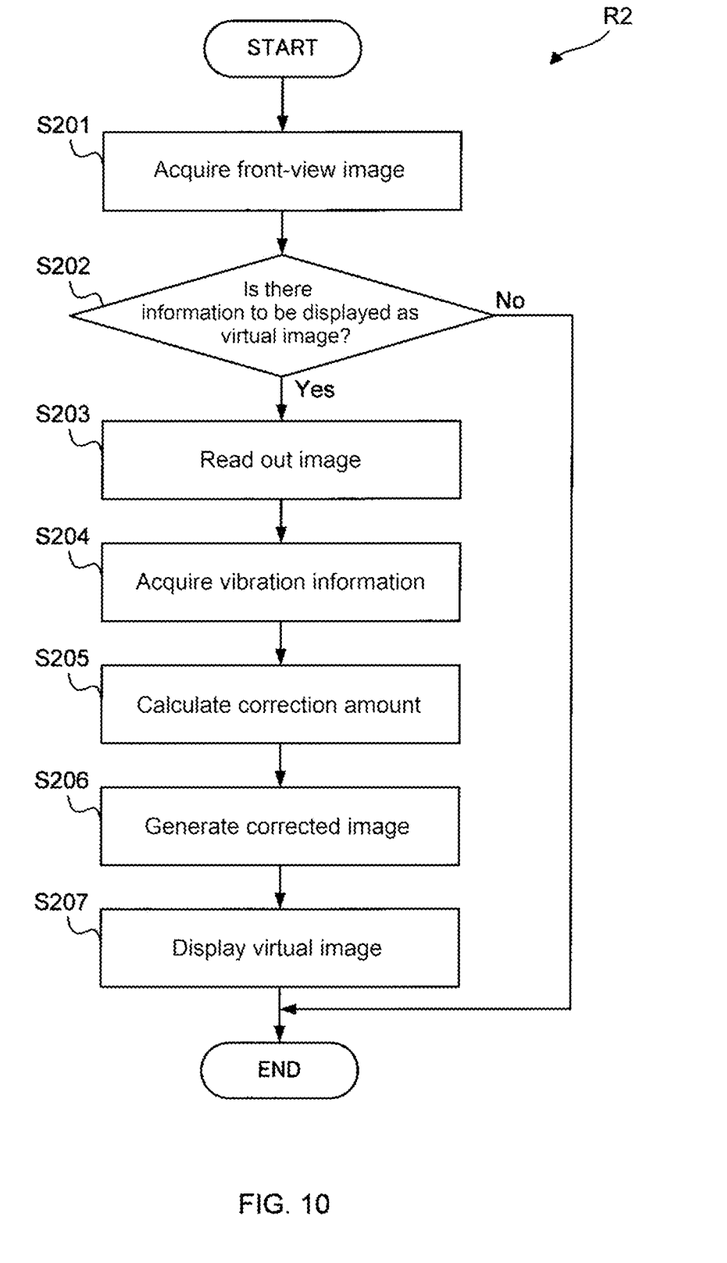
FIG. 10 is a diagram illustrating a virtual image display routine as an example of an operation routine of the HUD of Embodiment 2 of the present invention.

FIG. 10 is a diagram illustrating the virtual image display routine R2 as an example of the operation routine of the HUD 10 of Embodiment 2 of the present invention. The virtual image display routine R2 is repeatedly performed after the HUD 10 is turned on, for example.

Steps S201 to S204 and Step S207 of the virtual image display routine R2 are the same as Steps S101 to S104 and Step 107 of the virtual image display routine R1 illustrated in FIG. 7, and thus, the explanations will be omitted.

In Step S205, the control unit 105 calculates an amount of correction performed on the graphic IM included in the image based on the vibration information acquired from the vibration sensor 50. In this example, the amount of correction means the size of the blurring correction area CA in the blurring correction, the size of the emphasis correction area EA, and the maximum values of brightness and saturation in the emphasis correction area EA. The control unit 105 calculates the respective blurring correction areas CA in the horizontal direction and the vertical direction with respect to the contour EG of the graphic IM based on the respective amplitudes of the horizontal vibration RX and vertical vibration RY. The control unit 105 calculates the respective emphasis correction areas EA1 (EA2) in the horizontal direction and the vertical direction with respect to the center of the graphic IM based on the respective amplitudes of the horizontal vibration RX and vertical vibration RY.

Next, in Step S206, the control unit 105 generates a corrected image in which the contour EG of the graphic IM has been corrected by blurring the contour EG of the graphic IM and emphasizing the center of the graphic IM. The control unit 105 blurs the contour EG by gradually reducing the brightness and saturation toward the outside of the graphic IM within the respective horizontal and vertical blurring correction areas CA calculated in step S205. The control unit 105 emphasizes the center of the graphic IM by gradually increasing the brightness and saturation toward the center of the graphic IM based on the amplitudes of the horizontal vibration RX and the vertical vibration RY within the emphasis correction area EA1 or EA2.

In a manner similar to Embodiment 1, Steps S205 and S206 function as the image correction step in the virtual image display routine R2.

By performing the process of the virtual image display routine R2 including Steps S205 and S206, the control unit 105 can blur the contour EG and emphasize the center of the graphic IM, allowing the virtual image with further improved visibility to be displayed in the target space FS.

The correction amount in the bluffing correction and emphasis correction may be adjusted based on the depth in the target space FS at which the virtual image V is projected.

Figure 11:
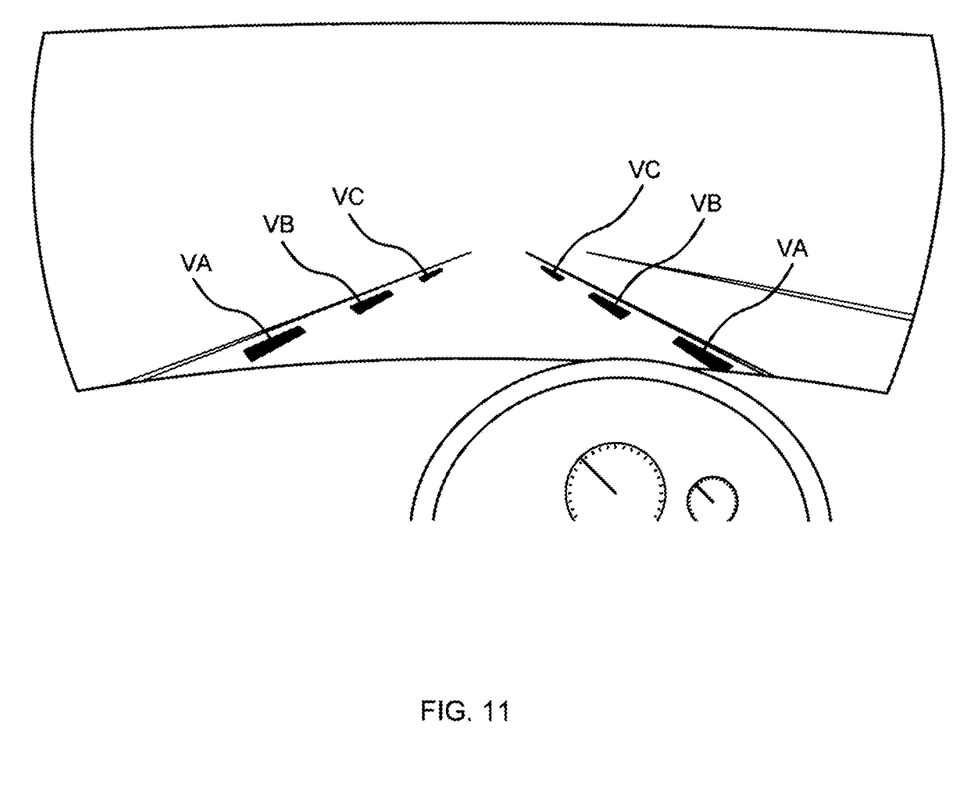
FIG. 11 is a diagram illustrating a display example of a virtual image projected by the HUD of the present invention.

FIG. 11 is a diagram illustrating a display example of a virtual image projected by the HUD 10 of the present invention.

The virtual images VA, VB and VC are virtual images that indicate white line marks emphasizing the positions of white lines for the traffic lane in which the automobile M is driving, for example.

In terms of the distances in the target space FS at which the virtual images VA, VB and VC are projected (distances from the driver D to the actual images which each of the virtual images VA, VB and VC is placed over), the greatest is the distance of the virtual image VA, and followed by the distance of VB and then VC. In this case, by the control unit 105 adjusting the amount of correction given to the virtual images VA, VB, and VC such that a virtual image projected further away is subjected to a greater amount of correction, the virtual image projected in a distant place can have good visibility.

Figure 12:
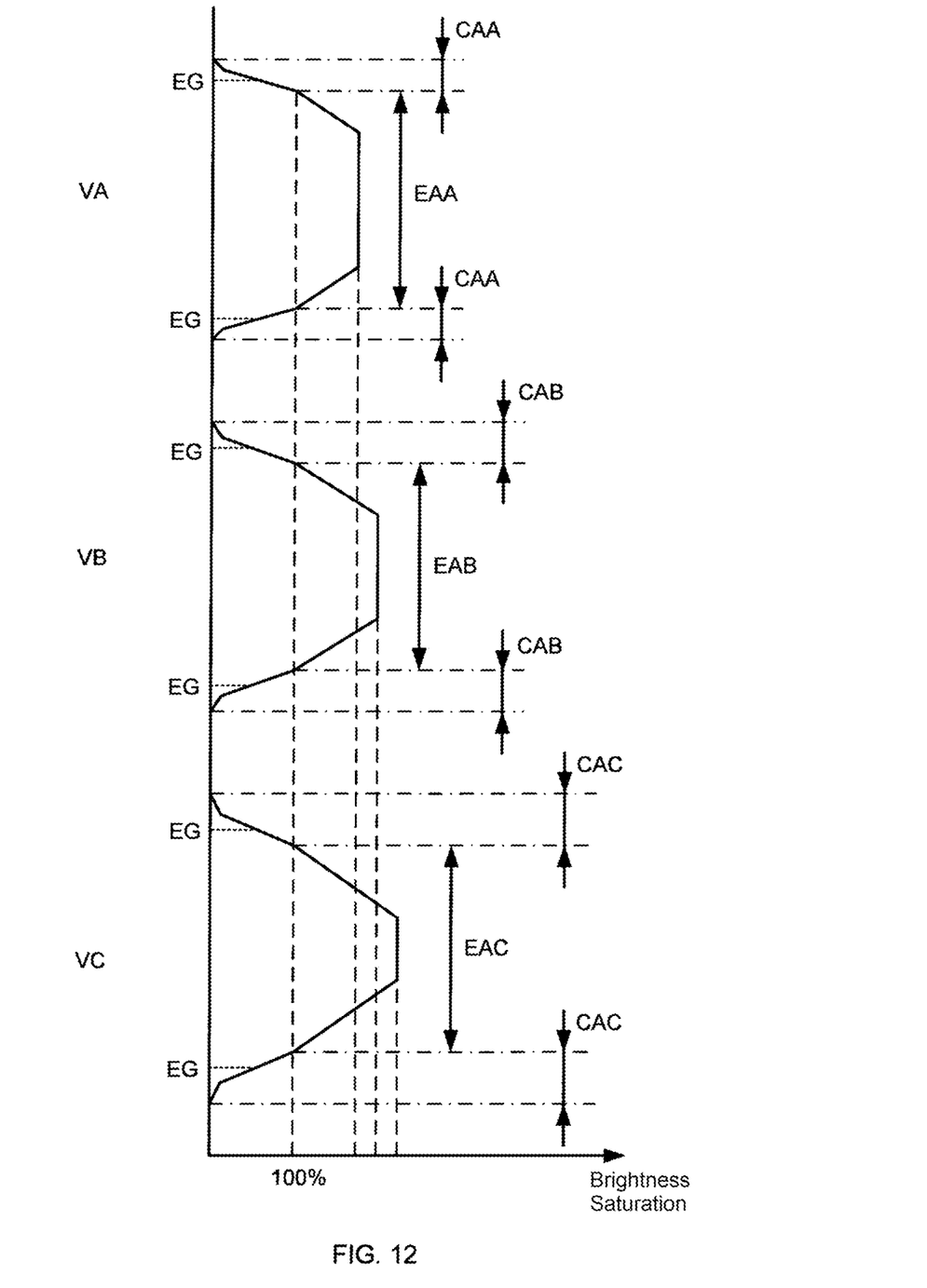
FIG. 12 is a diagram showing intensity distribution of brightness and saturation in the vertical direction of each of the virtual images representing the white line marks illustrated in FIG. 11.

FIG. 12 is a diagram showing intensity distribution of brightness and saturation in the vertical direction of each of the virtual images representing white line marks illustrated in FIG. 11.

As described above, the virtual image VA is displayed at the furthest position from the driver D in the target space FS, followed by VB, and then VC.

The amount of correction for each of the virtual images VA, VB, and VC is adjusted in accordance with the distance from the driver D such that VA<VB<VC is satisfied. Specifically, the virtual image VA displayed closer to the driver D is subjected to the correction process with a smaller correction amount, and the virtual image VC displayed further away from the driver D is subjected to the correction process with a larger correction amount.

That is, as illustrated in FIG. 12, the control unit 105 sets the sizes of the blurring correction areas CAA, CAB and CAC of the virtual images VA, VB and VC such that the size of the blurring correction area CAA is the largest, followed by CAB and then CAC. In other words, the further away the virtual image is displayed, the more strongly the contour EG is blurred.

In addition, the control unit 105 sets the sizes of the emphasis correction areas EAA, EAB and EAC of the virtual images VA, VB and VC such that the maximum value of the brightness and saturation, which is the emphasis amount, of the virtual image VA is the largest, followed by VB and then VC. In other words, the further away the virtual image is displayed, the more strongly it is emphasized.

For the correction in which the degree thereof is adjusted in accordance with the display distance of the virtual image in the target space FS, both or one of the blurring correction and the emphasis correction may be performed, as long as the correction is made so that the visibility of the virtual image to be displayed is improved based on the display distance of the virtual image in the target space FS.

As described above, in the HUD 10, the blurring correction area in the blurring correction and the maximum value of brightness and saturation in the emphasis correction are adjusted based on the distance of the virtual image to be displayed in the target space FS. This way, even in a virtual image displayed further away, improved visibility is ensured, which makes it possible to reduce discomfort felt by the driver due to shaking of the virtual image when the automobile M vibrates.

The correction process in the present specification is not limited to the blurring correction or the emphasis correction described above, and a correction may be performed by measuring the brightness and saturation in the vertical direction of a graphic in an image, and reducing the amount of change in areas before and after the part of the image where the brightness and saturation change greatly. Also, in the horizontal direction with respect to graphics in an image, areas where graphics in the vertical direction are formed may be made to differ from each other.

The correction process described above may be performed by the light projection unit 20. Below, a case where the correction process described above is performed by the light projection unit 20 and the light projection unit 20 is a liquid crystal display will be explained. For example, the control unit 105 provides a source driver of the light projection unit 20 with an image including a graphic IM read out from the storage unit 103, and correction area signals indicating blurring correction areas CA and emphasis correction areas EA in the horizontal direction and vertical direction based on the vibration information.

The source driver of the light projection unit 20 extracts, from the provided image, display data for the cells in which the image is to be displayed, and keeps the display data.

The source driver of the light projection unit 20 detects cells in which the brightness and saturation change greatly in the horizontal direction and the vertical direction, based on the extracted display data. The source driver of the light projection unit 20 corrects the display data such that the brightness and saturation gradually decrease in the cells within the blurring correction area CA, starting from the cell with a greater amount of change, based on the provided correction area signals. The source driver of the light projection unit 20 corrects the display data such that the brightness and saturation gradually increase the cells within the emphasis correction area EA, starting from the cell with a greater amount of change, based on the provided correction area signals.

The source driver of the light projection unit 20 generates driving voltages corresponding to the display data for the respective cells of the liquid crystal panel of the light projection unit 20 and supplies those driving voltages to the liquid crystal panel of the light projection unit 20. As a result, the liquid crystal panel of the light projection unit 20 can project display light LM on which the bluffing correction and emphasis correction have been performed in the horizontal direction and vertical direction.

This correction can be performed by the source driver even when the light projection unit 20 employs a light-emitting panel method such as an organic EL display or a light projection method such as DLP using the MEMS mirror or laser scanning. That is, the correction method of the present application to suppress the degradation of visibility of the virtual image V of the HUD 10 due to vibration of the automobile M, or to prevent discomfort felt by the driver D may be applied to any display methods used for the HUD.

What is claimed is:

1. A head-up display installed in a movable body, comprising:
   a processor configured to implement
      an image acquisition unit that acquires an image including a graphic, and
      an image correction unit that generates a corrected image corresponding to the acquired image;
   a vibration information acquisition unit that acquires vibration information indicating vibration of the movable body; and
   a display unit that displays the corrected image in a space as a virtual image;
   wherein the image correction unit generates the corrected image by performing, on the acquired image, a blurring correction for blurring a contour of the graphic in the corrected image based on the vibration information.

2. The head-up display according to claim 1,
   wherein the vibration information includes horizontal vibration information for vibration in a horizontal direction and vertical vibration information for vibration in a vertical direction, and
   wherein the image correction unit performs a blurring correction in the horizontal direction on a contour of the graphic in the image based on the horizontal vibration, and performs a blurring correction in the vertical direction on the graphic in the image based on the vertical direction information.

3. The head-up display according to claim 1,
   wherein the image correction unit performs the blurring correction on a contour of the graphic by gradually reducing brightness and saturation of the graphic towards an outside of the graphic based on the vibration information.

4. The head-up display according to claim 1,
   wherein the image correction unit performs the blurring correction by changing a size of an area on a contour of the graphic to be blurred in the blurring correction based on the vibration information.

5. The head-up display according to claim 1,
   wherein the image correction unit performs the blurring correction by changing a size of an area on a contour of the graphic based on a position of the virtual image to be displayed in the space in a depth direction.

6. The head-up display according to claim 1,
   wherein the image correction unit further performs an emphasis correction that emphasizes a part of the graphic in the image.

7. The head-up display according to claim 6,
   wherein the image correction unit performs the emphasis correction by gradually increasing brightness and saturation of the graphic towards a center of the graphic such that a part of the graphic is emphasized.

8. The head-up display according to claim 6,
   wherein the image correction unit performs the emphasis correction by changing maximum values of brightness and saturation of the graphic in the emphasis correction to be performed on the image, based on a position of the virtual image to be displayed in the space in a depth direction.

9. The head-up display according to claim 7,
   wherein the vibration information includes horizontal vibration information for vibration in a horizontal direction and vertical vibration information for vibration in a vertical direction, and
   wherein the image correction unit performs the emphasis correction by changing brightness and saturation in the horizontal direction of the graphic based on the horizontal vibration information, and changing brightness and saturation in the vertical direction of the graphic based on the vertical vibration information.

10. A video correction method of a head-up display installed in a movable body and including a display unit that displays a corrected image as a virtual image, comprising:
   an image acquisition step for acquiring an image including a graphic;
   a vibration information acquisition step for acquiring vibration information that indicates vibration of the movable body; and
   an image correction step for generating a corrected image by performing, on the acquired image, a blurring correction for blurring a contour of the graphic in the corrected image based on the vibration information.

11. A non-transitory computer-readable recording medium that stores therein a video correction program for a computer installed in a head-up display that is installed in a movable body and that includes a display unit displaying a corrected image as a virtual image, the image correction program causing said computer to perform:
   an image acquisition step for acquiring an image including a graphic;
   a vibration information acquisition step for acquiring vibration information that indicates vibration of the movable body; and
   an image correction step for generating a corrected image by performing, on the acquired image, a blurring correction for blurring a contour of the graphic in the corrected image based on the vibration information.

12. The head-up display according to claim 1, wherein the blurring correction is performed in a blurring correction area formed around the contour.

13. The head-up display according to claim 1, wherein the blurring correction area has a correction starting point and a correction end point, and respective positions of the correction starting point and the correction end point relative to the contour depend on an amplitude of the vibration.

* * * * *